United States Patent
Erbe et al.

(10) Patent No.: US 11,762,953 B2
(45) Date of Patent: Sep. 19, 2023

(54) EVENT-TRIGGERED ANALYSIS FOR HIGH FIDELITY SIMULATION

(71) Applicant: SAP SE, Walldorf (DE)

(72) Inventors: Lars Erbe, Stutensee (DE); Andreas Wildhagen, Wiesloch (DE); Maximilian Stueber, Mannheim (DE); Andre Pany, Bad Friedrichshall (DE); Samir Zeort, Waldorf (DE); Pablo Vicente Albert-Maestro, Trondheim (NO)

(73) Assignee: SAP SE, Walldorf (DE)

( * ) Notice: Subject to any disclaimer, the term of this patent is extended or adjusted under 35 U.S.C. 154(b) by 1265 days.

(21) Appl. No.: 16/209,237

(22) Filed: Dec. 4, 2018

(65) Prior Publication Data

US 2020/0175125 A1   Jun. 4, 2020

(51) Int. Cl.
*G06F 18/23*  (2023.01)
*G06F 30/20*  (2020.01)
*G06F 18/24*  (2023.01)
*G06F 119/12* (2020.01)

(52) U.S. Cl.
CPC .............. *G06F 18/23* (2023.01); *G06F 18/24* (2023.01); *G06F 30/20* (2020.01); *G06F 2119/12* (2020.01)

(58) Field of Classification Search
CPC ... G06F 2119/12; G06F 30/20; G06K 9/6267; G06K 9/6218
See application file for complete search history.

(56) References Cited

U.S. PATENT DOCUMENTS

| | | | |
|---|---|---|---|
| 2011/0320550 A1* | 12/2011 | Lawson | G06F 9/542 709/206 |
| 2016/0050261 A1* | 2/2016 | McDaid | H04L 45/302 709/204 |
| 2018/0255084 A1* | 9/2018 | Kotinas | G06K 9/6251 |

(Continued)

OTHER PUBLICATIONS

Cheng et al. "Situation-Aware IoT Service Coordination Using the Event-Driven SOA Paradigm". IEEE Transactions on Network and Service Management, vol. 13, No. 2, Jun. 2016. 13 Pages. (Year: 2016).*

(Continued)

*Primary Examiner* — Eunhee Kim
(74) *Attorney, Agent, or Firm* — Mintz Levin Cohn Ferris Glovsky and Popeo, P.C.

(57) ABSTRACT

Systems and methods for event-triggered analysis for high fidelity simulation. The method may comprise collecting event data produced by one or more event monitors in operational relationship with one or more elements of an event-producing system, wherein at least one of the one or more elements generates a plurality of events. The event data may be clustered into one or more groups, according to one or more event attributes. The event data may be selectively transmittable to one or more subscribers, by way of the one or more subscribers subscribing to one or more channels associated with the one or more groups. A publication mechanism may be implemented to classify the clustered event data into the one or more channels, the event data associated with at least one attribute being classified for transmission over at least one of the one or more channels.

19 Claims, 4 Drawing Sheets

(56) References Cited

U.S. PATENT DOCUMENTS

2019/0325095 A1\* 10/2019 Lekivetz ............... G06N 3/084

OTHER PUBLICATIONS

Gomes et al. "A Middleware with Comprehensive Quality of Context Support for the Internet of Things Applications". Sensors 2017, 17, 2853; doi:10.3390/s17122853. 45 Pages. (Year: 2017).\*

Sheltami, Tarek R., Anas A. Al-Roubaiey, and Ashraf S. Hasan Mahmoud. "A survey on developing publish/subscribe middleware over wireless sensor/actuator networks." Wireless Networks 22.6 (2016): 2049-2070. (Year: 2016).\*

Gaddah "A Pro-Active Mobility Management Scheme for Publish/Subscribe Middleware Systems". Ottawa-Carleton Institute of Electrical and Computer Engineering Department of Systems and Computer Engineering Carleton University. 179 Pages. (Year: 2008).\*

\* cited by examiner

EVENT-TRIGGERED ANALYSIS FOR HIGH FIDELITY SIMULATION

TECHNICAL FIELD

The disclosed subject matter generally relates to simulation technology and more particularly to event-triggered analysis for high fidelity simulation.

BACKGROUND

Advancements in computing and communications technology have made it possible to develop computerized models that are digital simulations of real life systems or structures. For example, using sensors to monitor different aspects of a bridge, an industrial plant or a medical monitoring system, a variety of data may be captured about different elements and dynamics of such systems and how these elements interact or affect other internal and external relationships.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, manufactured articles, devices, systems and methods are provided for collecting a plurality of event data generated by a plurality of sensors coupled to a plurality of elements in an event-producing system. Categorized event data may be streamed over a plurality of channels to a plurality of subscribers, by way of a publish/subscription mechanism, for example, such that selected event data from among the plurality of event data is received by a first set of subscribers from among the plurality of subscribers over the plurality of channels.

At least the first set of subscribers may detect one or more triggering events from the selected event data received by the first set of subscribers; and invoke a process to perform a first set of actions based on the one or more triggering events. The first set of actions may comprise at least one of generating a sensory notification based on analysis of event data associated with the one or more triggering events; or performing a detailed analysis of event data associated with the one or more triggering events that is more resource-intensive or more comprehensive than an analysis performed on the event data prior to detecting the one or more triggering events.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

Figure 1:
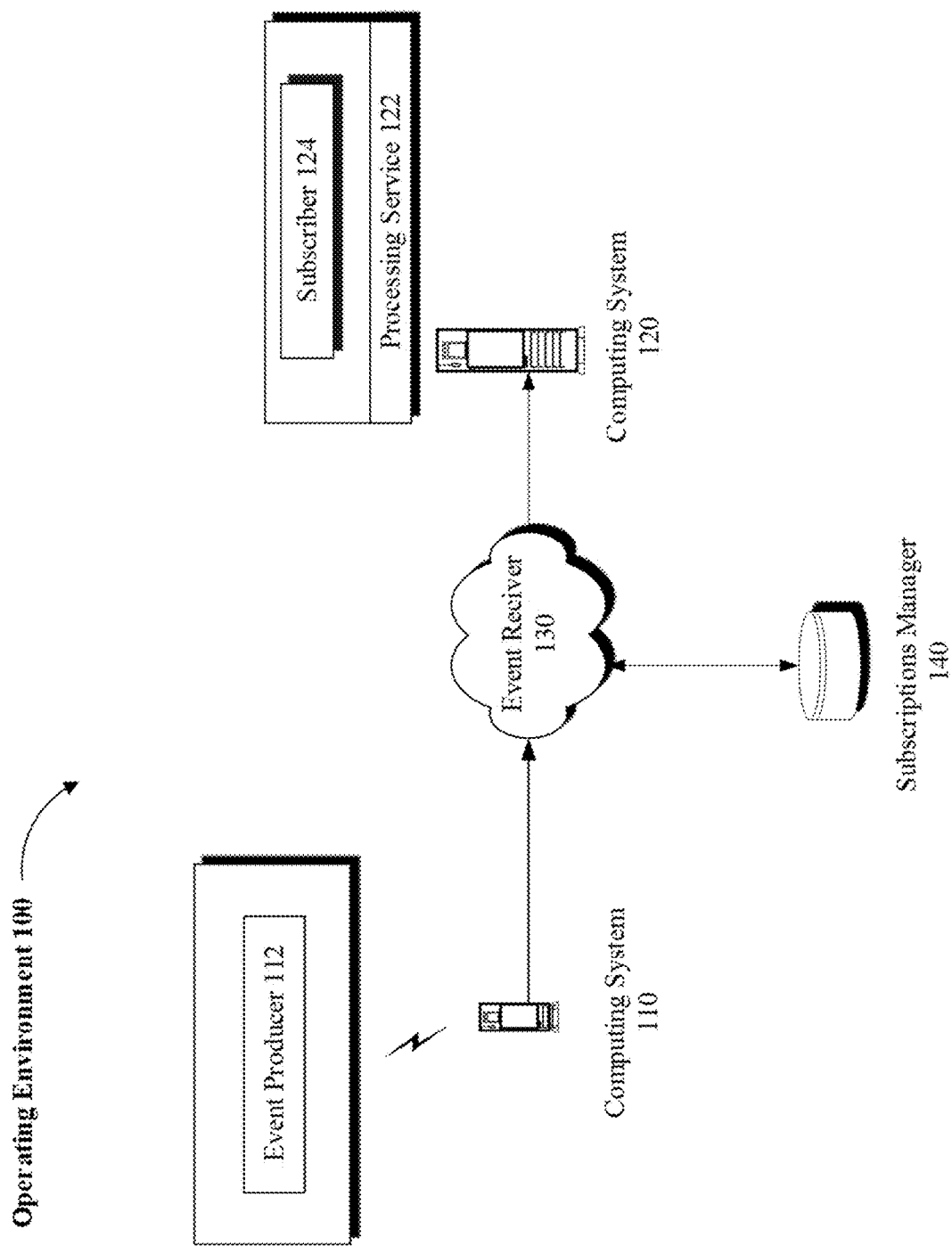
FIG. 1 illustrates an example operating environment in accordance with one or more embodiments, wherein event data may be collected and streamed over multiple subscription channels.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Depending on implementation, data may be captured over a dedicated course of time or the lifespan of a targeted system by way of processing signals generated by sensors positioned, connected or otherwise associated with various parts of the system. Using such monitoring technology, it is possible to collect vast amounts of data about the targeted system. The collected data may be in turn utilized for the purpose of simulation, detecting and preventing faults or to better understand certain system operations and functionalities.

One approach for fault detection or compliance may be to use workflow analysis to better understand the relationship between the large amounts of data collected and the possibility of the occurrence of a fault or event. Workflow monitoring systems may be developed based on a model that provides a notification to a human operator about a detected fault or event that may require further attention.

Models that utilize workflow analysis schemes may need a detailed knowledge about the underlying application programing interfaces (APIs) used to capture or simulate the workflow events. A human operator who does not have a meaningful understanding or appreciation for the underlying simulated features may be unable to use the conventional workflow monitoring systems effectively. Furthermore, due to the large volumes of data being collected, from a large variety of elements and features within a simulated system, the overall effort for configuring the workflow process for performing diagnostics may be significant.

In many instances, workflow analysis schemes may be ineffective or inefficient in that a proper processing and understanding of the data collected may require a substantial amount of resources to analyze large amounts of data in real-time or all the time. On the other hand, if more cost-effective methods are used to limit the amount of data analyzed or to delay the processing of data to a later time (e.g., when more resources are available or resource utilization is less expensive) important or critical events may be missed or may go undetected.

Enhanced computing systems and technological improvements are needed that can help provide results that are more meaningful, more accurate and easier to understand in a timely and efficient manner. To overcome the above deficiencies computer-implemented systems and methods are provided, in accordance with one or more embodiments, for collecting a plurality of event data generated by a plurality of sensors coupled to a plurality of elements in an event-producing system. Categorized event data may be streamed, in real time, over a plurality of channels to a plurality of subscribers, by way of a publish/subscription (pub/sub) mechanism, such that selected event data from among the plurality of event data is received by a first set of subscribers from among the plurality of subscribers over the plurality of channels.

At least the first set of subscribers may detect one or more triggering events from the selected event data received by the first set of subscribers and invoke a process to perform a first set of actions based on the one or more triggering events. The first set of actions may include, for example, generating a sensory notification based on analysis of event data associated with the one or more triggering events or performing a detailed analysis of event data associated with the one or more triggering events such that the detailed analysis is more resource-intensive or more comprehensive than an analysis performed on the event data prior to detecting the one or more triggering events.

In accordance with alternative aspects, systems and methods are provided for collecting simulation event data produced by one or more event monitors in operational relationship with one or more elements of an event-producing system. The one or more elements may generate a plurality of events such that corresponding event data may be captured by the one or more event monitors. The event data may be clustered into one or more groups, according to one or more event attributes. In one implementation, the event data may be selectively transmitted to one or subscriber devices, applications, or systems.

In example embodiments, event data may be transmitted by way of the one or more subscriber devices that subscribe to one or more channels associated with the one or more groups. A publication mechanism may be configured to classify the clustered event data into one or more data streaming channels. Event data associated with at least one attribute may be classified for transmission over at least one of the one or more channels. The event, as provided in further detail below, may be associated with a timeline such that event data classified for transmission over the one or more channels is manageable according to selected time intervals.

To help manage the volume of collected event data collected or transmitted, event data may be selectively published to the one or more subscribers in accordance with subscription rules defined for said one or more channels. In one or more variations, a subscriber device or machine or application may be invoked, in response to receiving certain triggering event data published over one or more channels. In response to such invocation, certain actions may be taken based on the event data indicating occurrence of one or more triggering events as provided in further detail below.

Referring to FIG. 1, an example operating environment 100 is illustrated in which a computing system 110 is in communication with an event producer 112. Event producer 112 may be an event monitor, a sensor or other software or hardware implemented device configured to monitor events. Event producer 112 may, for example, be a dedicated app or other type of software application, in communication with, or running either fully or partially on computing system 110. Computing system 110 may be a general purpose computer, a handheld mobile device, a tablet, or other communication capable device, sensor or monitor.

In some implementations, event producer 112 or computer system 110 may define a combined system for detecting events generated by one or more elements of an event-producing system which is being simulated or monitored. Event producer 112 and computer system 110 either alone or in combination may sense, detect or monitor the generated events and produce event data that is transmitted to an event receiver 130. Event receive 130 may be implemented on a computing system or software that is independent of or embedded in computing system 110, depending on implementation.

Figure 2:
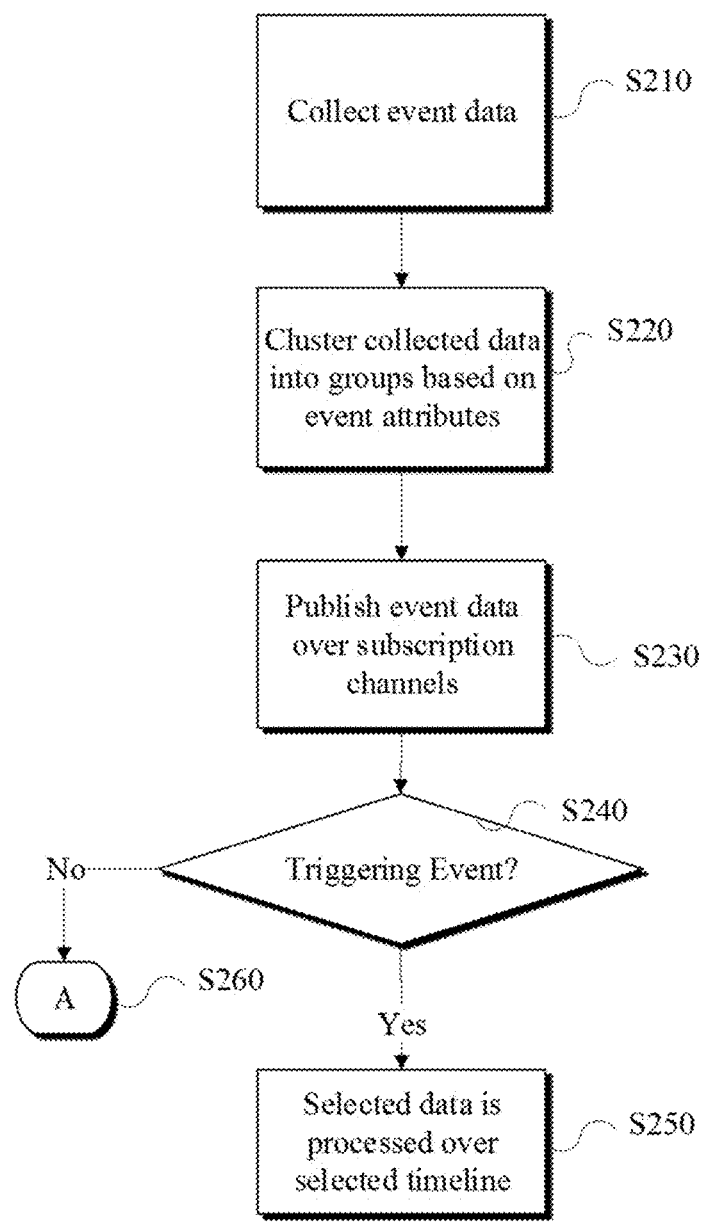
FIG. 2 is an example flow diagram of a method of detecting a triggering event based on receiving large volumes of event data, over multiple subscription channels, and invoking an associated process, in accordance with one or more implementations.

Referring to FIGS. 1 and 2, in accordance with one aspect, event producer 112 may communicate event data over a communication network to an event receiver 130 configured to collect event data generated by one or more elements of an event-producing system (S210). It is noteworthy that a plurality of event producers 112 may be configured to communicate a plurality of event data about a plurality of elements associated with an event-producing system. As such, the amount of data generated by the event producers 112 may be significantly large and voluminous.

To help manage large volumes of event data and the proper delivery to particular subscribers 124, in an efficient manner, collected event data may be clustered into groups based on one or more attributes associated with the event data received by event receiver 130 (S220). Depending on implementation, the clustering may be performed either by the event receiver 130 or by other systems (e.g., computing system 110) or an independent or associated service (e.g., subscription manager 140).

For example, subscription manager 140 may, in communication with event receiver 130, process the event data received from event producer 112 for certain attributes or tags (e.g., data or metadata defining a type, quality, source, or attribute associated with the event data). Data received by event receiver 130 may be stored on a storage device local to, remote to, or embedded in one or more of computing systems 110, event receiver 130 or subscription manager 140, for example.

Event receiver 130 or subscription manger 140, either alone or in combination, may publish the collected event data, over one or more subscription channels, to one or more subscribers 124 (S230). The subscribers may include hardware or software implementations (e.g., applications or software objects instantiated over one or more computing systems 120) that may process event data received through the subscription channels, for one or more triggering events, either independently or in associate with a processing service 122.

For example, subscriber 124 or processing service 122 may be configured on computing system 120 to service event data to detect one or more triggering events (S240). The event data may be streamed over one or more subscription channels from event producer 112 and event receiver 130, via a local or wide area network (e.g., the Internet) for example, as provided in further detail below with reference to one or more embodiments and implementations.

It is noteworthy that at least one of computing systems 110, 120, event receiver 130, subscription manager 140 and other software or hardware elements associated with monitoring, collecting and transmitting the related event data may be implemented over a centralized or distributed (e.g., cloud-based) computing environment as dedicated resources or may be configured as virtual machines that define shared processing or storage resources.

Execution, implementation or instantiation of event producer 112 and subscriber 124, or the related features and components associated with event receiver 130 or subscription manager 140 may also define special purpose machines or special purpose computers that either individually or in combination provide a variety of subscription-based services that enable a subscriber to efficiently receive and detect one or more triggering events.

In accordance with some implementations, in response to detecting a triggering event, a subscriber may invoke an application or instantiate a process, for example, on computing system 120 to process certain selected data collected over a selected timeline (S250). If a triggering event is not detected, the process may continue (S260) by, for example, looping back to one or more earlier steps (e.g., collecting event data) or terminate. Depending on application or context, it may be desirable to process a certain volume of event data collected during a specific time period, before and/or after a triggering event is detected, as provided in the example scenarios below.

For instance, in one example scenario, one or more sensors (e.g., event producers 112) may be connected to a patient to generate data that is fed to a patient monitor (e.g., an event receiver 130). The generated event data may be produced by multiple sensors connected to multiple body parts or configured to monitor multiple features and vital signs for the patient. The produced data may be voluminous to an extent that real-time processing of all the produced data may not be practical or necessary considering the costs or the availability of computing resources.

Thus, in accordance with one aspect, the generated data is streamed through monitored channels (e.g., data pipelines) to the event receiver 130. The streamed data collected from the sensors may be categorized, grouped or clustered based on certain parameters or rules. The parameters or rules may take into consideration the nature or the source from which the data was generated. For example, certain data may have been generated by sensors associated with a critical organ or feature of the patient (e.g., heart, brain or lungs), or certain data may be considered time sensitive (e.g., data generated or received after a patient suffered a particular type of trauma).

Depending on implementation, the collected event data may be clustered or categorized into different groups in association with different attributes (e.g., data source, priority, sensitivity, quality, quantity, urgency, context or other factors) that may identify certain event data as more important or interesting for the purpose of detecting a triggering event, for example. Thus, depending on implementation, different categories and groups of data may be collected, identified, stored or streamed as belonging to different groups, clusters or streaming channels.

By way of example, a subscription-based technology may be utilized to manage the grouping or streaming volumes of data generated by various sources (e.g., sensors) and associating recognized group of data with one or more batch processes. In other words, a group of identified batch processes may be designated as subscribers to one or more streams of data according to the category of the data included in the streams. In this manner, as a certain data stream becomes active, one or more batch processes associated with the data stream may be invoked without requiring the invocation of other batch processes. According to such implementation, resources may be more efficiently allocated, prioritized or utilized as defined by certain needs or rules.

According to the grouping, certain data collections or streams may be recognized and associated with one or more computing processes (e.g., one or more batch processes). A batch process associated with a target set of data, or an identified stream of data, may be utilized to process or analyze the data according to certain defined rules and parameters and optionally over a certain period of time. For example, if data is being generated by a patient monitor that collects and reports vital signs associated with different patient features, then a stream of data categorized as generated by the heart monitor part of the patient monitoring system may be identified as indicating a heartbeat under a predetermined acceptable threshold.

If the system is configured to recognize such event or threshold as a triggering event, the related event data may be identified (e.g., by subscriber 124) as an indication to invoke one or more batch processes that would process the data generated by the heart monitor for a defined period of time (e.g., from five minutes prior to detection of a low heartbeat signal to five minutes after). In this manner, one or more batch processes associated with a particular stream or group of data may be invoked in real-time, as needed. In one aspect, available resources (or additional resources) may be allocated to all or selected batch processes invoked by a triggering event to help a higher level of analyzes and generate a report (e.g., either visually or otherwise) in real-time.

As another example, a subscriber application may be implemented to monitor data streams produced by electrodes connected to a patient, where the data streams include information about the patient heart rate and anomalies associated therewith and also indicating start and end times for an observation period (e.g., two hours after heart surgery). In some embodiments, a batch application for a heart attack diagnostic may be implemented by way of configuring the system to detect a triggering event based on event data (e.g., a low heart beat) or contextual data (e.g., patient master data, such as age, gender, is smoker, etc.). Certain rules may also be applied to indicate, for example, how often to execute the subscriber application (e.g., once for each triggering event, but no additional runs within 10 minutes of detecting a triggering event).

In yet another example, the systems and methods disclosed herein may be applied to monitor events generated in a wind turbine. In such example, sensory data generated from various structural elements of a wind turbine may be collected for the purpose of fault detection or loss prevention (e.g., fatigue analysis). Triggering events may be detected for instance by defining thresholds on bending movements (e.g., by placing virtual sensors at predetermined locations, i.e., "hot spots," on the wind turbine). If a threshold is met, a triggering event (e.g., "Strong Bending Moment Event") may be detected. Depending on the level of details or amount of event data collected, additional information (e.g., NORMAL, MEDIUM, HIGH, CRITICAL) may be provided to a human operator, for example, to indicate the importance, urgency or sensitivity of a detected event.

In the above example, in addition to providing detected or collected virtual sensor values for one or more hot spots or structural elements in the wind turbine, a batch application may be invoked to compute intensive element analysis and produce a complete data set for a window of time (e.g., 30 or 60 seconds) around the time when the triggering event or events occurred. The complete dataset may be utilized to provide, for example, a three-dimensional (3D) visualization to help a human operator or a machine to properly detect and access the detected situation and take appropriate action.

The above methodology provides for a timely invocation of one or more batch processes with a focus on a target data set or series of event, and desirably based on rules that define a meaningful slice in time for detection or analysis. Such approach provides for the capability to timely and efficiently address captured triggering events associated with large volumes of collected event data, particularly when such events are, for example, critical, important or otherwise interesting. In one aspect, less important or less interesting streams of data (at the time) may be overlooked (e.g., not processed or process with a lower level of priority or allocation of resources)—at least for a certain time period—while other more interesting or higher priority streams of data may be analyzed in more detail and with more intensity (e.g., using a higher level or higher allocation of resources, better quality resources, or resources that are faster or more responsive).

As such, the result and the level of analysis for a triggering event may be also a matter of implementation, in that certain triggering events may require more or less resources or more or less details in order to, for example, provide a human operator or a computing system with sufficient information to make a determination about the next steps to be taken after the triggering event is detected, either in real-time, in near-real-time, or according to context and importance.

The proposed implementations discussed above and as illustrated in the accompanying figures overcome the deficiencies associated with the traditional systems by invoking on time and high fidelity simulation and analysis as needed, and by focusing the amount or level of analysis and computing resources to meaningful timelines and collections of data in particularly identified categories that are closely related to particularly interesting or important contexts, for example.

Figure 3:
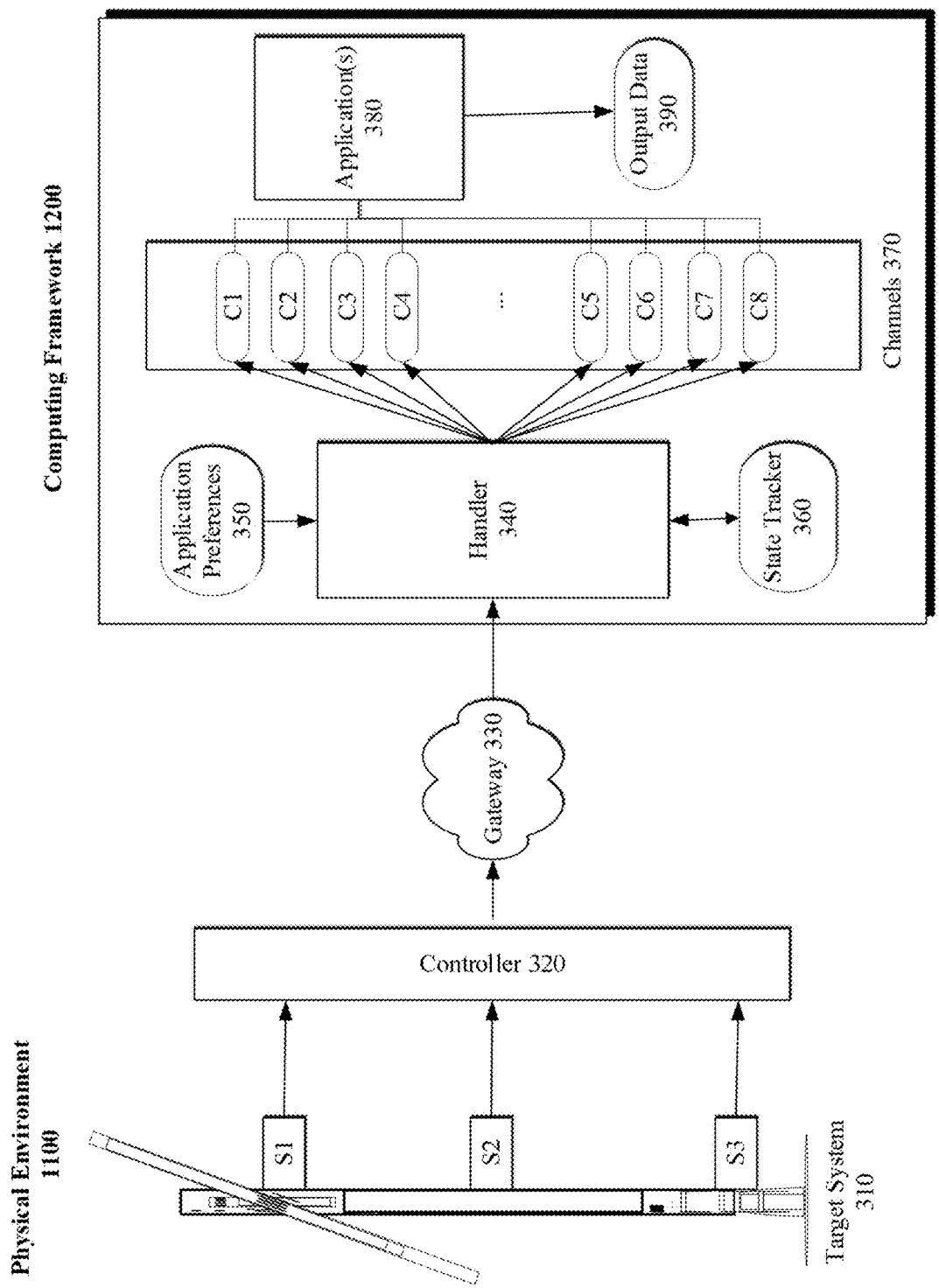
FIG. 3 illustrates example physical environment and computing framework, in accordance with one or more embodiments.

Referring to FIG. 3, example physical environment 1100 and computing framework 1200 are illustrated. As shown, the physical environment 1100 may include a target system 310, such as an event-producing system (e.g., a wind turbine), that may be in communication with computing framework 1200 by way of controller 320 and gateway 330. Target system 310 may be instrumented with monitoring or sensor devices (e.g., S1, S2, S3). The monitoring devices may generate signals or event data that provide information about the state of certain features, components or elements of target system 310.

For example, the provided information may include, without limitation, event data associated with a physical, functional, environmental or operational state of an element of the target system 310. The various components, features, subcomponents, sub-features and other monitored items associated with target system 110 may be hereafter referred to as "element" or "elements". The provided information about such elements may be referred to as hereafter as raw data, sensor data or event data or any reasonable variation.

The event data may be transmitted to controller 320 for the purpose of analysis, storage and further transmission. In example embodiments, controller 320 may be a machine or system implemented in hardware, software, or a combination of the two, where controller 320 manages the receiving of event data from one or more sources (e.g., S1, S2, S3), stores the data in data storage media (not shown) and transmits the data over to a handler 340 in computing framework 1200 byway of a gateway 330. Gateway 330 may be a component of a communications network that may provide for the secure transmission of data from controller 320 to handler 340. Gateway 330 may be implemented over a local or remote communications network (e.g., the Internet). In some variations, controller 320 or the gateway 330 may be components of a cloud storage system or service.

In accordance with one aspect, one or more applications 380 may be invocable or instantiable in computing framework 1200 for the purpose of processing event data generated by one or more sources in target system 310. Raw sensor data or event data may be generated in a variety of formats and configurations. For example, S1 may generate data in format A, S2 may generate data in format B, and S3 may generate data in format C. Further, each data source may generate data in different packet sizes. Such data formats and packets sizes may not be compatible with one or more applications 380 executing in computing framework 1200. Reformatting and converting the data generated by a multitude of sources for applications 380 may require a substantial programming overhead and may be time consuming and also expensive.

To help reduce undesirable application overhead, computing framework 1200 may be implemented to advantageously include one or more of handler 340, application preferences 350, state tracker 160 and channels 170. As shown in FIG. 1, handler 140 may have access to application preferences 350 (e.g., a computing component, a data structure, or storage media) which provides handler 140 with policy, configuration or preference information (e.g., data formatting policies, data source and destination bindings, etc.) for one or more applications 380. Handler 340 may be also in communication with a state tracker 360 configured to synchronize data transmission to one or more applications 380 based on timeline or time series data associated with event data packaged by handler 340.

Channels 370 may be communication mechanisms (e.g., data buffers, temporary storage, data subscription nodes, etc.) that may be implemented to transmit data suitable for consumption by one or more applications 380. In one or more embodiments, a first application 380 may be an event producer 112 and a second application 380 may be a subscriber 124, as shown in FIG. 1. In some scenarios, an application 380 may be both an event producer and a subscriber in the operating environment 100.

Figure 4:
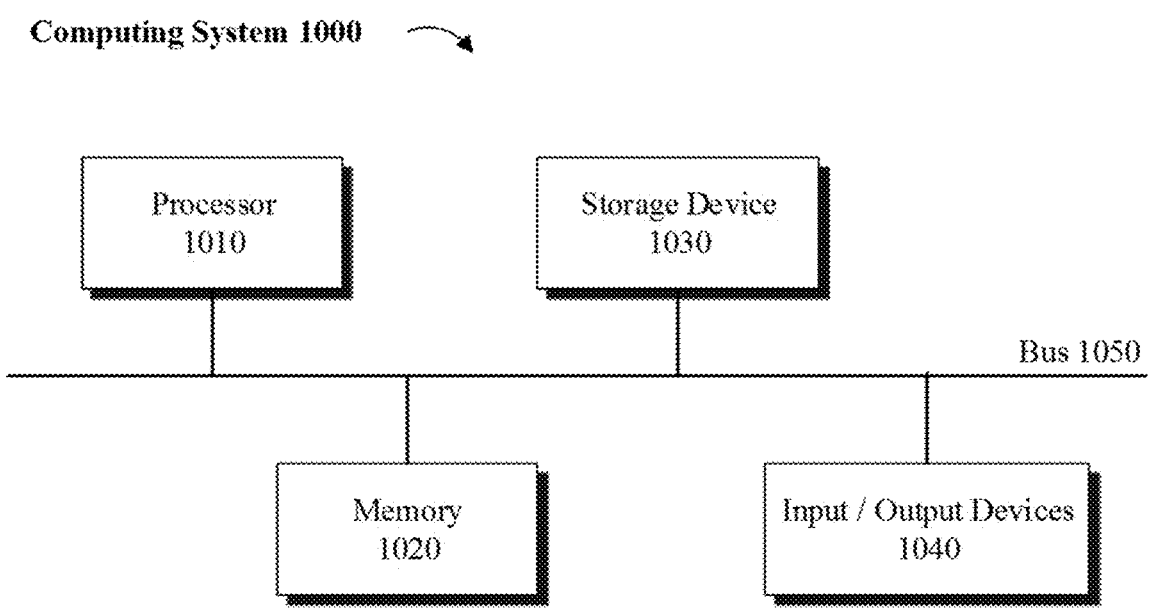
FIG. 4 is a block diagram of a computing system 1000 consistent with one or more embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
   collecting event data produced by one or more event monitors in operational relationship with one or more elements of an event-producing system being monitored, wherein at least one of the one or more elements generates a plurality of events;
   clustering the event data into one or more groups for batch processing by one or more subscribers, the clustering according to one or more event attributes, the event data being selectively transmittable to one or more subscribers, by way of the one or more subscribers subscribing to one or more channels associated with the one or more groups;
   implementing a publication mechanism to classify for transmission to the one or more subscribers the clustered event data into the one or more channels, the event data, which is associated with at least one event attribute, being classified for transmission over at least one of the one or more channels, the at least one event attribute characterizing at least one of a source associated with the event data and a priority associated with the event data; and
   in response to the event data being associated with the at least one event attribute and being classified for transmission over at least one of the one or more channels, associating the event data with a timeline for transmission such that the event data classified for transmission over at least one of the one or more channels is manageable according to time intervals used for the timeline for the transmission, and
   publishing, based on the clustered one or more groups and the timeline, the event data to the one or more subscribers in accordance with subscription rules defined for the one or more channels, the subscription rules defining a manner in which the event data is to be streamed over the one or more channels, such that an amount of event data forwarded to a first subscriber according to the timeline is limited to a first set of event data from among the event data collected from the event-producing system, the first set of data being limited in the amount to enable the first subscriber of the one or more subscribers to take a first action based on at least the first event data indicating occurrence of a first event.

2. The method of claim 1, further comprising delivering the first event data from among a plurality of event data published over the first channel to at least the first subscriber, the first subscriber being configured to take the first action based on at least the first event data indicating occurrence of the first event.

3. The method of claim 2, wherein the first event data is associated with one or more event attributes that, when detected, invoke a process for analyzing the event data collected during a first time interval.

4. The method of claim 3, wherein the first subscriber is configured to take the first action, in response to determining that the first event data was generated or collected during a predetermined time interval.

5. The method of claim 2, wherein the first subscriber is configured to take the first action in accordance with detecting a first set of events occurring during a first time interval.

6. The method of claim 5, wherein the first action comprises invoking a first application for analysis of collected event data over a second time interval.

7. The method of claim 6, wherein the first application generates results simulating events associated with selected elements of the event-producing system.

8. The method of claim 7, wherein the generated results provide information about at least one threshold associated with at least one element of the event-producing system.

9. The method of claim 7, wherein the generated results provide information about status of one or more elements of the event-producing system during a time interval in which a predetermined set of events associated with the collected event data occurred.

10. A system comprising:
    at least one programmable processor; and
    a non-transitory machine-readable medium storing instructions that, when executed by the at least one programmable processor, cause the at least one programmable processor to perform operations comprising:
    collecting event data produced by one or more event monitors in operational relationship with one or more elements of an event-producing system being monitored, wherein at least one of the one or more elements generates a plurality of events;
    clustering the event data into one or more groups for batch processing by one or more subscribers, the clustering according to one or more event attributes, the event data being selectively transmittable to one or more subscribers, by way of the one or more subscribers subscribing to one or more channels associated with the one or more groups;
    implementing a publication mechanism to classify for transmission to the one or more subscribers the clustered event data into the one or more channels, the event data, which is associated with at least one event attribute, being classified for transmission over at least one of the one or more channels, the at least one event attribute characterizing at least one of a source associated with the event data and a priority associated with the event data; and in response to the event data being associated with the at least one event attribute and being classified for transmission over at least one of the one or more channels, associating the event data with a timeline for transmission such that the event data classified for transmission over at least one of the one or more channels is manageable according to time intervals used for the timeline for the transmission, and publishing, based on the clustered one or more groups and the timeline, the event data to the one or more subscribers in accordance with subscription rules defined for the one or more channels, the subscription rules defining a manner in which the event data is to be streamed over the one or more channels, such that an amount of event data forwarded to a first subscriber according to the timeline is limited to a first set of event data from among the event data collected from the event-producing system, the first set of data being limited in the amount to enable the first subscriber of the one or more subscribers to take a first action based on at least the first event data indicating occurrence of a first event.

11. The system of claim 10, wherein a subscriber is configured to take the first action based on at least first event data indicating occurrence of the first event, in response to delivery of the first event data, from among a plurality of event data published over the first channel, to the first subscriber;

wherein the first event is associated with one or more event attributes that, when detected by the first subscriber, causes the first subscriber to invoke a process for analyzing the first event data collected during a first time interval.

12. The system of claim 11, the first action is taken, in response to determining that the first event data was generated or collected during a predetermined time interval.

13. The system of claim 11, wherein the subscriber is configured to take the first action in accordance with detecting a first set of events occurring during the first time interval.

14. The system of claim 13, wherein the first action comprises invoking a first application for analysis of collected event data over a second time interval.

15. A computer program product comprising a non-transitory machine-readable medium storing instructions that, when executed by at least one programmable processor, cause the at least one programmable processor to perform operations comprising:

collecting event data produced by one or more event monitors in operational relationship with one or more elements of an event-producing system being monitored, wherein at least one of the one or more elements generates a plurality of events;

clustering the event data into one or more groups for batch processing by one or more subscribers, the clustering according to one or more event attributes, the event data being selectively transmittable to one or more subscribers, by way of the one or more subscribers subscribing to one or more channels associated with the one or more groups;

implementing a publication mechanism to classify for transmission to the one or more subscribers the clustered event data into the one or more channels, the event data, which is associated with at least one event attribute, being classified for transmission over at least one of the one or more channels, the at least one event attribute characterizing at least one of a source associated with the event data and a priority associated with the event data; and in response to the event data being associated with the at least one event attribute and being classified for transmission over at least one of the one or more channels, associating the event data with a timeline for transmission such that the event data classified for transmission over at least one of the one or more channels is manageable according to time intervals used for the timeline for the transmission, and publishing, based on the clustered one or more groups and the timeline, the event data to the one or more subscribers in accordance with subscription rules defined for the one or more channels, the subscription rules defining a manner in which the event data is to be streamed over the one or more channels, such that an amount of event data forwarded to a first subscriber according to the timeline is limited to a first set of event data from among the event data collected from the event-producing system, the first set of data being limited in the amount to enable the first subscriber of the one or more subscribers to take a first action based on at least the first event data indicating occurrence of a first event.

16. The computer program product of claim 15, further comprising delivering the first event data from among a plurality of event data published over the first channel to at least the first subscriber, the first subscriber being configured to take the first action based on at least the first event data indicating occurrence of the first event.

17. The computer program product of claim 16, wherein the first event data is associated with one or more event attributes that, when detected, invoke a process for analyzing the event data collected during a first time interval.

18. The computer program product of claim 17, wherein the first subscriber is configured to take the first action, in response to determining that the first event data was generated or collected during a predetermined time interval.

19. The computer program product of claim 16, wherein the first subscriber is configured to take the first action in accordance with detecting a first set of events occurring during a first time interval.

* * * * *